United States Patent
Park et al.

(10) Patent No.: US 8,700,100 B2
(45) Date of Patent: Apr. 15, 2014

(54) HEADSET, OPERATING METHOD AND SYSTEM THEREOF, AND PORTABLE TERMINAL SUPPORTING THE SAME

(75) Inventors: Sung Kyu Park, Gyeonggi-do (KR); Eun Kyoung Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 814 days.

(21) Appl. No.: 12/873,513

(22) Filed: Sep. 1, 2010

(65) Prior Publication Data
US 2011/0070832 A1    Mar. 24, 2011

(30) Foreign Application Priority Data
Sep. 23, 2009 (KR) .................. 10-2009-0090212

(51) Int. Cl.
| H04M 1/00 | (2006.01) |
| H04B 1/38 | (2006.01) |
| H04B 7/00 | (2006.01) |

(52) U.S. Cl.
USPC ........................................ 455/567; 455/41.2

(58) Field of Classification Search
USPC ........................................................ 455/567
See application file for complete search history.

(56) References Cited

U.S. PATENT DOCUMENTS

| 2004/0204168 A1* | 10/2004 | Laurila ...................... 455/569.1 |
| 2009/0097624 A1* | 4/2009 | Sangberg et al. ......... 379/114.21 |
| 2009/0186579 A1* | 7/2009 | Kim et al. ..................... 455/41.2 |
| 2011/0215921 A1* | 9/2011 | Ben Ayed et al. ........ 340/539.11 |

FOREIGN PATENT DOCUMENTS

KR    2009-77230    7/2009 .............. H04B 7/24

* cited by examiner

Primary Examiner — Yuwen Pan
Assistant Examiner — Ayodeji Ayotunde
(74) Attorney, Agent, or Firm — Cha & Reiter, LLC (57) ABSTRACT

A headset, a method and a system for operating the headset, and a portable terminal using the same are provided. A method for operating a headset, includes: receiving one of a voice call connection request message or an image call connection request message requested from another portable terminal through a mobile communication system by a portable terminal; generating a call connection request signal corresponding to the received call connection request message by the portable terminal; transmitting the generated call connection request signal to a headset connected through a near distance communication channel by the portable terminal; receiving the call connection request signal indicating a voice call or an image call from the portable terminal through the near distance communication channel by the headset; and outputting an alarm specified according to a type of the received call connection request signal by the headset.

20 Claims, 5 Drawing Sheets

HEADSET, OPERATING METHOD AND SYSTEM THEREOF, AND PORTABLE TERMINAL SUPPORTING THE SAME

CLAIM OF PRIORITY

This application claims, pursuant to 35 USC 119, priority to, and the benefit of the earlier filing date of, that patent application filed in the Korean Patent Office entitled "Headset, Operating Method and System Thereof, and Portable Terminal Supporting The Same," filed on Sep. 23, 2009 and afforded serial number 10-2009-0090212, the entire contents of which are incorporated herein.

BACKGROUND OF THE INVENTION

1. Field of the Invention

The present invention relates to the field of headset technology, and more particularly, to a headset capable of operating to discriminate a voice call and an image call.

2. Description of the Related Art

As technology has significantly advanced to decrease the size of batteries while maintaining electric capacity, portable terminals have been able to utilize the advanced battery technology to implement various optional functions. For example, a portable terminal may have a file playing function capable of playing audio and video files that have been previously stored or for providing language instruction for learning another language (e.g., English). Further, the portable terminal includes various additional functions such as a camera function photographing still images, a video camera function tracking and photographing moving images.

Moreover, the portable terminal provides a function for forming a near distance communication channel with specific devices located at a near distance and exchanging or controlling data as well as a mobile communication function using a base station. For example, a Bluetooth module may be used as a representative communication module having the near distance communication function.

However, a conventional near distance communication function is limited to only a function of sending signals generated by a portable terminal to the portable terminal that can not satisfy a user's various desires. Accordingly, there is a demand for the development of various functions that may provide various operations to a specific user function of the portable terminal.

SUMMARY OF THE INVENTION

The present invention has been made in view of the above problems, and provides a headset that may support a headset to discriminate a voice call and an image call among call functions of a portable terminal to form a corresponding call channel according to an operation of the headset, a method and a system for operating the headset, and a portable terminal using the same.

In accordance with an aspect of the present invention, a method for operating a headset includes: receiving by a portable terminal a call connection message, requested from another portable terminal through a mobile communication system, the call connection message comprising one of a voice call connection request message or an image call connection request message, generating a call connection request signal corresponding to the received call connection message by the portable terminal; and transmitting the generated call connection request signal to the headset that is connected through a near distance communication channel by the portable terminal, the portable terminal and the headset being registered to each other.

In accordance with another aspect of the present invention, a portable terminal includes: a radio frequency unit receiving a call connection request message request message requested by another portable terminal through a mobile communication system, the call connection request message comprising one of a voice call connection request message or an image call connection; a controller generating a call connection request signal corresponding to the received call connection request message; and a first near distance communication module forming a near distance communication channel for transmitting the call connection request signal to a headset.

In accordance with another aspect of the present invention, a headset includes: a second near distance communication module forming a near distance communication channel with a portable terminal and receiving a call connection request signal indicating one of a voice call or an image call from the portable terminal through the near distance communication channel; a headset controller controlling an output of an alarm specified according to a type of the call connection request signal; and an alarm output unit outputting the specified alarm under control of the headset controller.

In accordance with another aspect of the present invention, a system for operating a headset includes: a portable terminal receiving one of a voice call connection request message or an image call connection request message requested by another portable terminal through a mobile communication system, generating a call connection request signal corresponding to the received voice call connection request message or image call connection request message, and transmitting the generated call connection request signal to a headset through a near distance communication channel; and a headset receiving the call connection request signal through the near distance channel to output an alarm specified according to a type of the received call connection request signal.

In a headset, a method and a system for operating the headset, and a portable terminal using the same, the headset discriminates a type of a call and forms a channel in a specific call method.

BRIEF DESCRIPTION OF THE DRAWINGS

The objects, properties and advantages of the present invention will be more apparent from the following detailed description in conjunction with the accompanying drawings, in which.

DETAILED DESCRIPTION OF THE INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
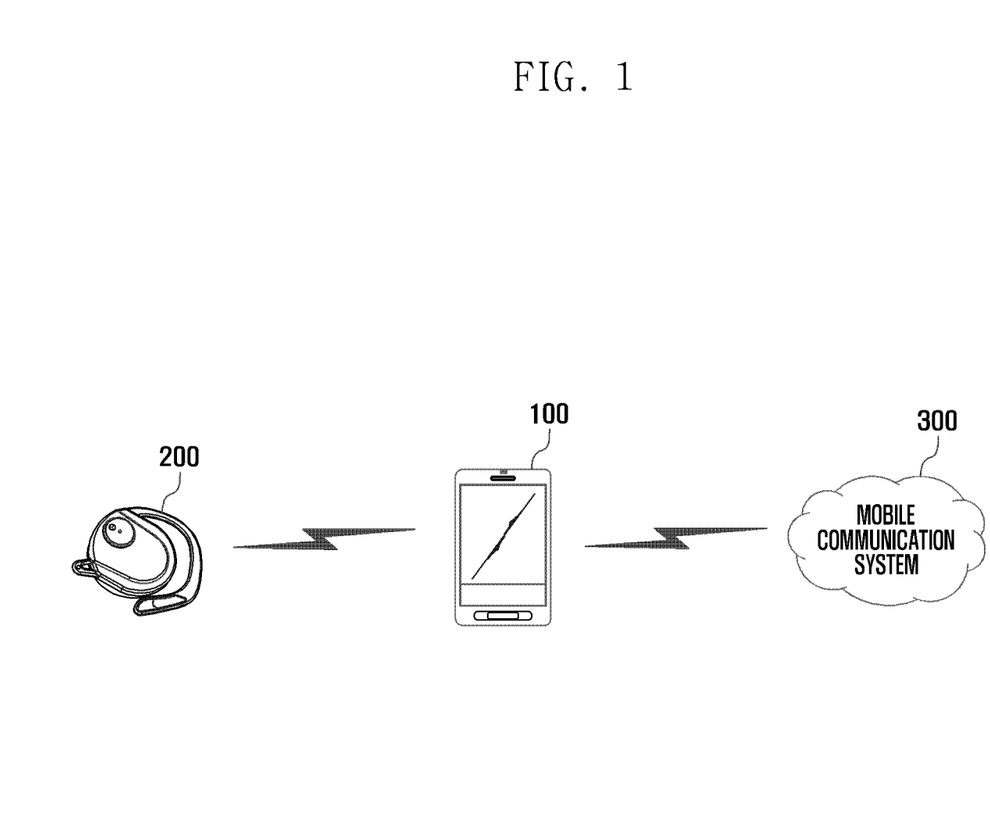
FIG. 1 is a block diagram schematically illustrating a configuration of a headset operating system according to an exemplary embodiment of the present invention.

FIG. 1 is a block diagram schematically illustrating a configuration of a headset operating system according to an exemplary embodiment of the present invention capable of supporting a call function.

Referring to FIG. 1, the headset operating system according to an exemplary embodiment of the present invention includes a headset 200, a portable terminal 100, and a mobile communication system 300.

The system of the present invention having a structure as described above supports sending a message requesting a voice call channel or an image (i.e., multi-media) call channel to the portable terminal 100 according to a request of another portable terminal (not shown) through the communication system 300. In this case, the portable terminal 100 may generate a call connection request signal corresponding to the received voice call connection request message or image call connection request message, and transmit it to the headset 200. Accordingly, the headset 200 outputs an alarm specified according to a type of the received call connection request signal, generates a select signal selecting a type of a specific call according to a user's operation and transmits the selected signal to the portable terminal 100. Next, the portable terminal 100 may form a specific call channel according to the signal provided from the headset 200 and send a signal provided through the mobile communication system to the headset 200. Through the foregoing procedures, the headset operating system of the present invention may support the headset to discriminate between a voice call connection request and an image call connection request among call functions and output an alarm according to the type of connection request so that a user can select a type of a specific call. Hereinafter, respective structural elements constituting the system will be described in detail.

The mobile communication system 300 is a system providing mobile communication services of the portable terminal 100, and is configured by various arrangements.

For example, the mobile communication system 300 may include a base station, a base station controller, a mobile switching center (MSC), and a home location register, which are well known in the field of cellular communications and need not be described or illustrated in detail herein. The mobile communication system 300 may form a channel between the portable terminal 100 and another portable terminal using the base station, support signal transmission and reception necessary for a call, perform a call channel setting operation with the portable terminal 100 using the base station controller, and control call channel formation. A call connection request message sent from the base station controller can be switched to the portable terminal 100 by the MSC. Accordingly, the portable terminal 100 may form a call channel with another portable terminal or a wired phone. The mobile communication system supports forming one of a voice call channel and an image call channel between the portable terminal 100 and another portable terminal. Further, the mobile communication system 300 may support transmitting an audio signal through the voice call channel, and transmitting an audio signal and an image signal through the image call channel.

The headset 200 may form a near distance communication channel with the portable terminal 100, and receive and output various signals provided from the portable terminal 100. In particular, the headset 200 of the present invention may receive one of a voice call connection request signal or an image call connection request signal. Further, when the headset 200 receives one of the voice call connection request signal or the image call connection request signal, it may output an alarm specified according to a type of the received call connection request signal, for example, a specific audio signal, a vibration of a specific pattern, or a lamp on/off of a specific pattern. Moreover, the headset 200 may generate a select signal selecting one of the voice call connection request signal or the image call connection request signal according to user's operation, and send the generated select signal to the portable terminal 100. Next, the headset 200 may output an audio signal provided from the portable terminal 100. A construction and functions of the headset 200 will be described with reference to the accompanying drawings.

The portable terminal 100 forms a call channel with another portable terminal through the mobile communication system 300. At this time, the portable terminal 100 may support one of a voice call or an image call according to a request of another portable terminal. To do this, the portable terminal 100 may include a hardware arrangement, for example, a camera (or video recorder) capable of executing an image call. Further, the portable terminal 100 forms a near distance communication channel with the headset 200. The portable terminal 100 may convert of the received voice call connection request message or image call connection request message requested from the another portable terminal and transmitted by the mobile communication system 100 into a call connection request signal that may be transmitted through a near distance communication channel to the headset 200. Moreover, the portable terminal 100 receives one of a voice call connection select signal or an image call connection select signal from the headset 200, and sends a corresponding response message based on the received signal to the mobile communication system 300. Next, the portable terminal 100 may form a voice call channel or an image call channel with another portable terminal according to the select signal provided from the headset 200.

As described above, a headset operating system according to an embodiment of the present invention may support a user wearing a headset to know a type of a currently received call connection request message and to form a specific call channel according a type of a call selected by the user. A construction and of the portable terminal 100 and the headset 200 and functions thereof will be explained with reference to the accompanying drawings.

Figure 2:
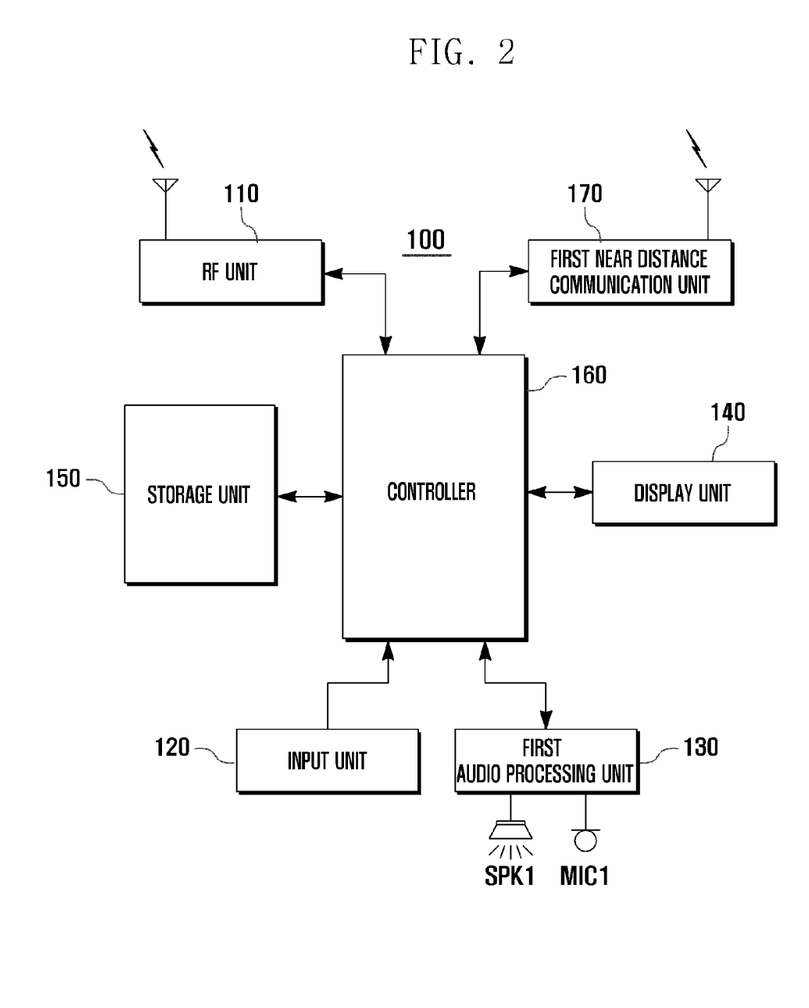
FIG. 2 is a block diagram schematically illustrating a configuration of a portable terminal shown in FIG. 1.

FIG. 2 is a block diagram schematically illustrating a configuration of a portable terminal shown in FIG. 1.

Referring to FIG. 2, a portable terminal 100 of the present invention includes a radio frequency unit 110, an input unit 120, a first audio processing unit 130, a display unit 140, a storage unit 150, a first near distance communication unit 170, and a controller 160. The portable terminal 100 may further include a camera unit for supporting an image call. Hereinafter, the first near distance communication module 170 is described as a Bluetooth module which is representative of other types of near distance communication protocols.

In the portable terminal 100 having a structure as described above, when the radio frequency unit 100 receives a voice call connection request message or an image call connection request message in a state that the first near distance communication module 170 forms a near distance communication channel with the headset 200, the portable terminal may convert the received voice call connection request message or image call connection request message into a signal applicable to a near distance communication channel specification formed with the headset 100 between, and transmit the converted signal to the headset 100. Further, the portable terminal 100 may receive a call connection select signal from the headset 200 and form a specific type of a call channel according to a type of the select signal. Respective structural elements will be explained in detail.

The RF unit 110 forms a communication channel for voice call and a communication channel for image call under the control of the controller 160. At this time, the RF unit 110 forms a voice call channel, a data communication channel, and/or an image call channel with the mobile communication system 300. To do this, the RF unit 110 may include a transmitter (not shown) for up-converting a frequency of a transmitted signal and for amplifying the signal and a receiver (not shown) for low-noise-amplifying a received signal and for down-converting the received signal. The RF unit 110 may exchange signals necessary for a voice call connection, for example, a voice call connection request message, and a response message thereto. On the other hand the RF unit may exchange signals necessary for an image call connection, for example, an image call connection request message, and a response message thereto. The RF unit 110 may transmit an audio signal or a video signal collected through a voice call channel or an image call channel to another portable terminal, receive an audio signal or a video signal provided from another portable terminal through a call channel, and send it to the controller 160.

The input unit 120 receives input of numeric or character information, and includes a plurality of input keys and function keys for setting all kinds of functions. The function keys may include arrow keys, side keys, and hot keys set to execute specific functions. Further, the input unit 120 generates and sends key signal associated with a user setting and a function control of the portable terminal 100 to the controller 160. The input unit 120 can be composed of a key pad of a specific pattern or a key map in a touch screen according to a manufacturing manner. The key pad may be configured by a 3*4 key pad or a QWERTY key pad, and the key map is configured by a 3*4 key map or a QWERTY key map. The input unit 120 may generate and send an input signal for forming a near distance communication channel, an input signal for canceling the near distance communication channel, and various input signal for activating user functions of a portable terminal after formation of the near distance communication channel to the controller 160.

The first audio processing unit 130 includes a first speaker SPK1 for playing an audio signal to be transmitted/received during a voice call or an image call, and a first microphone MIC1 for collecting a user's speeches or other audio signals during the voice call or the image call. The first audio processing unit 130 supports a function that allows the portable terminal 100 to output an audio signal, for example, a music playing function or a call function. When a specific music item is played or a call connection is achieved, the first audio processing unit 130 may output an audio signal using the first speaker SPK1 according to the music playing function or the call connection function. When a near distance communication channel is formed between the headset 200 and the portable terminal 100, the first audio processing unit 130 may intercept the output the first speaker SPK1 so as not to output an audio signal under the control of the controller 160. Further, the headset 200 includes a headset microphone. When a headset microphone of the headset 200 collects audio signals in a state that a call function is activated, the first audio processing unit 130 may inactivate an audio signal collection function of the first microphone MIC1 to. Meanwhile, when the RF unit 110 receives a call connection request message, the first audio processing unit 130 may output a corresponding alarm sound. In addition, when a call connection request message is received, the portable terminal 100 may output one of an alarm using a vibration module, an alarm using a lamp, and an alarm using a message receiving information display of the display unit 140. Furthermore, when a select signal selecting a type of a call is received from the headset 200, the portable terminal 100 may stop an output of the alarm.

The display unit 140 displays input information of a user or information that the portable terminal 100 provides for the user as well as different kinds of menus in the portable terminal 100. The display unit 140 may provide various screens, for example, an idle screen, a message making screen, a call screen, a game screen, a music playing screen, used for the portable terminal 100. In particular, the display unit 140 may output a menu screen for operating the first near distance communication module 170, a screen indicating a communication channel formation state through the first near distance communication module 170, a screen corresponding to a voice call connection request message receiving state or an image call connection request message receiving state, and a screen corresponding to reception of a voice call connection select signal or an image call connection select signal. In the meantime, the display unit 140 can be configured to be one of a Liquid Crystal Display (LCD) or an Organic Light Emitted Diode (OLED). When the LCD or OLED is configured as a form of a touch screen, the display unit 140 may include an input means. To do this, the display unit 140 may be provided with a display panel and a touch sensor disposed on the display panel. Further, the display unit 140 may provide various menu screens that may be performed based on a touch entered on to the touch screen. When the portable terminal 100 performs an image call function, the display unit 140 may output images collected by a camera (or video recording device) as a preview screen on one side of the display panel and an image received from another portable terminal at another side of the display panel.

The storage unit 150 may store application programs necessary for a function operation according to an embodiment of the present invention, an application for playing various stored files, a key map or a menu map for operating a touch screen. Here, the key map and the menu map may become various patterns. Namely, the key map may be a keyboard map, a 3*4 key map, a QWERTY key map, or a control key map for controlling operation of a currently activated application program. Further, the menu map is a menu map for controlling operation of a currently activated application program or a menu map having various menu items provided by the portable terminal. The storage unit 150 may include a program area (not shown) and a data area (not shown).

The program area may store an operating system (OS) for booting the portable terminal 100 and operating the foregoing structural elements, and an application program. In this case, the application program may include a web browser for accessing an Internet server, a music playing application program for playing music or other types of sound sources, an image output application program for playing photographs or video recordings (i.e., moving images). In particular, the program area of the present invention stores a call function operating program for supporting a call of the portable terminal 100 and a near distance communication application program for operating a first near distance communication module 170. The call function operation program is a program for operating RF unit 110, and includes a routine supporting signal transmission and reception for a voice call channel or an image call channel with the mobile communication system 300 and a routing supporting routine for transmission of an audio signal or an image signal through a formed call channel.

Furthermore, when the call function operation program receives a voice call connection select signal or an image call connection select signal from a headset 200, it may include a routine for supporting the forming of a call channel according to the received select signal. The near distance communication operation program includes a routine for transmission reception of signal and transmission of specific data necessary for the headset and a near distance communication channel. In particular, the near distance communication operation program may include a routine for discriminating a type of a call channel and generating a voice call connection request signal or an image call connection request signal corresponding to the type of messages, a routine for transmitting the formed call connection request signal to the headset 200, and a routine for receiving a select signal provided from the headset 200 and sending the select signal to the call function application program.

The data area is an area for storing data created according to the use of the portable terminal, and may store various contents. Moreover, the display unit 140 is implemented by a touch screen, the data area may store a user input achieved through the touch screen. In particular, the data area of the present invention may execute a routine for buffering the foregoing various messages or signals, and for supporting a buffering function of an audio signal received from the mobile communication system 300 and a buffering function of an audio signal from the headset 200 during performing a call function.

The first near distance communication module 170 is a communication module capable of forming a near distance communication channel with the headset 200. The first near distance communication module 170 can be configured as an infrared communication module, a Zigbee communication module, or a Bluetooth module. In particular, the Bluetooth module is a standard with an RF transmission for near distance, one-to-many, speech and data transmission, and may pass through solid materials except for metals to enable communication between the headset 200 and the portable terminal 100. The Bluetooth module enables communication between terminals within a distance range from about 10 cm to 10 m, and can be extended to 100 m if a frequency of a transmission signal is set higher. Conventionally, the Bluetooth module uses the Industrial Scientific Medical (ISM) band (2.402 GHz through 2.480 GHz) of the 2.4 GHz band with a transmission speed of 1 Mbps, and a frequency hopping method (79/23 hop, 1600 hop/sec) for preventing interference. The Bluetooth module employs low power consumption (idle stat of 0.3 mA, maximum value of 30 mA during transmission/reception), and transmission distance of 10 m, and optionally up to 100 m. To prevent signal interference, the Bluetooth module has a lower guard band of 2.4 GHz through 2.402 GHz and an upper guard band of 2.48 GHz through 2.4835 GHz.

The Bluetooth module is divided into a plurality of classes according transmission power. Respective transmission powers of classes 1, 2, and 3 are defined as 100 mW, 2.5 mW, and 1 mW. The Bluetooth module uses Gaussian Frequency Shift Keying (GFSK) modulation method, and enables voice support of 3 channels with A-Law, u-Law PCM, CVSDs (Continuous Variable Slope Delta Modulation). The first near distance communication module 170 configured by the foregoing Bluetooth module forms a communication channel with the headset 200, transmits a signal discriminating a type of a call, and receives a signal corresponding to the selection of the type of a call from the headset 200.

In detail, the first near distance communication module 170 generates a voice call connection request signal corresponding to a voice call connection request message or an image call connection request signal corresponding to an image call connection request message according to the control of the controller 160. At this time, the near distance communication module 170 generates the signals applicable as defined in the Bluetooth specification. For example, if a procedure of transmitting a "Ring" signal to the headset 200 is needed at the time of receiving the call connection request message, the first near distance communication module 170 of the present invention may generate a "Ring_Audio" as a signal corresponding to a voice call connection request message and a "Ring_Video" as a signal corresponding an image call connection request message.

The controller 160 controls a power supply (not shown) to respective structural elements of the portable terminal 100 to support execution of an initialization procedure. When the initialization procedure is terminated, the controller 160 may operates to form a communication channel with the headset 200 through the first near distance communication module 170 according to a user's operation. Furthermore, the controller 160 operates to generate a signal corresponding to a type of a call connection request message received by the RF unit 110, and operates to transmit the generated signal to the headset 200 through the first near distance communication module 170. Next, the controller 160 may operate to generate a specific type of a call channel based on a call connection select signal provided from the headset 200, to transmit collected audio signals or image signals to another portable terminal according to a formed call channel, or to output an audio signal or an image signal provided from the another portable terminal through a display unit 140 and the headset 200.

As mentioned above, the portable terminal according to an embodiment of the present invention operates to generate a specific signal capable of transmitting through the near distance communication module according to a type of a call connection request message and to transmit the generated specific signal to the headset 200 to discriminate a type of a call received by the headset 200. In addition, the portable terminal 100 operates to form a call channel of a specific type according to a call connection select signal provided from the headset 200.

Figure 3:
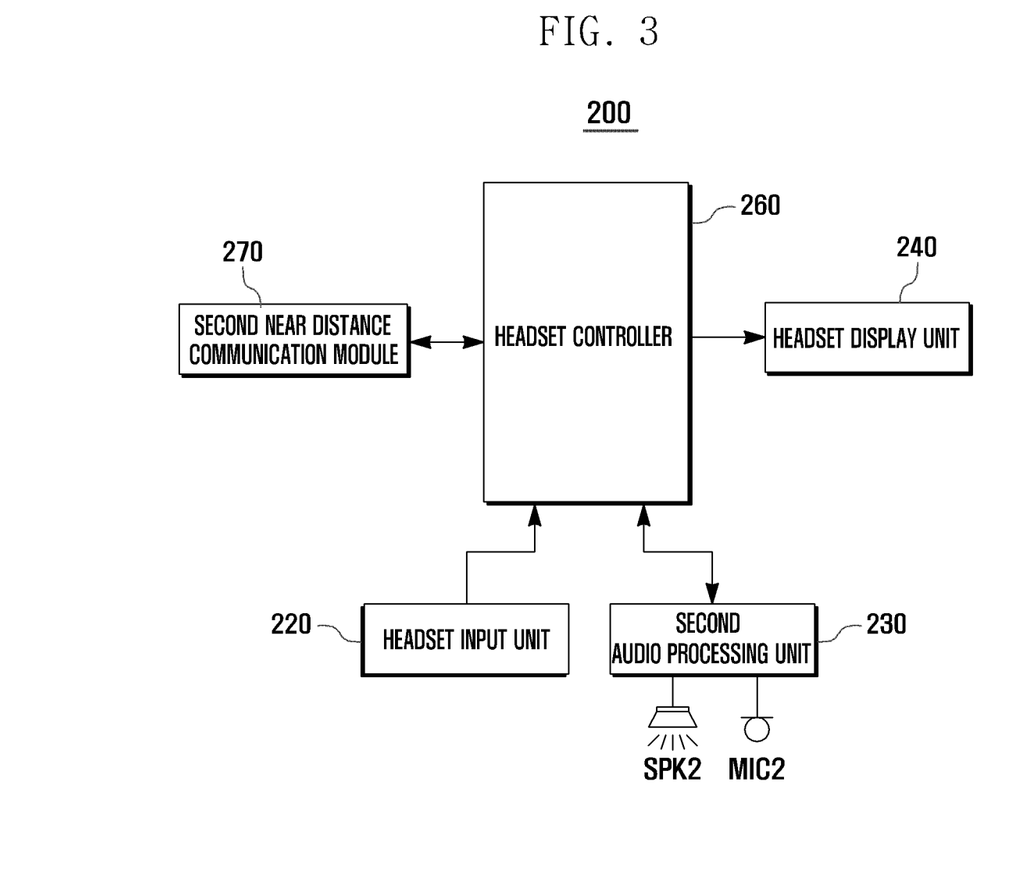
FIG. 3 is a block diagram schematically illustrating a configuration of a headset shown in FIG. 1.

FIG. 3 is a block diagram schematically illustrating a configuration of a headset shown in FIG. 1.

Referring to FIG. 3, a headset 200 of the present invention may include a second near distance communication module 270, a headset input unit 220, a second audio processing unit 230, a headset display unit 240, and a headset controller 260. The headset 200 may further include a vibration module supporting vibration of the headset, and a lamp, which may be turned-on/off under the control of the headset controller 260. In the foregoing arrangement, a headset speaker SPK2 of the second audio processing unit 230, the headset vibration module, and the lamp can operate as an alarm output unit outputting a specific alarm according one of a voice call connection request signal or an image call connection request signal received from the portable terminal 100. Namely, the headset speaker SPK2 may output a first guide sound or a second guide sound, and a first bell sound or a second bell sound according to the call connection request signal. The headset vibration module may output a first vibration pattern or a second vibration pattern according to the call connection request signal. The lamp may perform a first lamp on/off sequence or a second lamp on/off sequence according to the call connection request signal.

The headset 200 having the construction as illustrated in FIG. 3 forms a communication channel with the first near distance communication module 170 of the portable terminal 100. When the headset 200 receives a call connection request signal indicating a type of a call provided from the portable terminal 100, the second communication module may output a corresponding alarm, as describe previously. Further, the headset 200 may generate a select signal selecting a type of a call according to a user operation and transmit it to the portable terminal 100.

Then, the headset 200 may receive and output an audio signal from the portable terminal 100 based on a call channel formed between the portable terminal 100 and another portable terminal through the mobile communication system 300 or transmit a collected audio signal to the portable terminal 100. The following is a detailed explanation of a construction and functions thereof in the headset of the present invention.

The second near distance communication module 270 is a communication module supporting the forming of a near distance communication channel with the portable terminal 100. The second near distance communication module 270 can be configured by a communication module similar to the first near distance communication in the portable terminal 100 to form a near distance communication channel. Namely, when the first near distance communication module 170 is a Bluetooth module, the second near distance communication module 270 can be configured as a Bluetooth module. The second near distance communication module 270 may form a near distance communication channel with the first near distance communication module 170 according to a request of the portable terminal 100, and receive a signal discriminating a type of a call, namely, a voice call connection request signal or an image call connection request signal from the portable terminal 100.

For example, the second near distance communication module 270 may receive a "Ring_Audio" signal corresponding to the voice call connection request signal or a "Ring_Video" signal corresponding to the image call connection request signal from the first near distance communication module 170. Further, the second near distance communication module 270 can transmit a signal selecting a type of a specific call according to a user operation. For example, a user may select an "ATA_Audio" signal corresponding to a voice call connection select signal or an "ATA_Video" signal corresponding to an image call connection select signal to the first near distance communication module 170. Next, the second near distance communication module 270 may receive an audio signal from the portable terminal 100 based on a call channel formed by the portable terminal 100, and transmit an audio signal by a headset microphone MIC2 of the second audio processing unit 230 to the portable terminal 100.

The headset input unit 220 is provided at one side of the headset 200, and can be configured by a key pad, a button key, or a side key according to its shape. Since the headset 200 is manufactured to have a small size to wear it in ears, the headset input unit 220 preferably has a suitable number of keys. For example, the headset input unit 220 may include keys for generating an input signal for controlling a volume, an input signal for selection a voice call connection, an input signal for selecting an image call connection, an input signal for indicating a call termination, and an input signal for selecting a call rejection. At this time, the headset input unit 220 may include a specific number of keys, and support the generation of different input signals from corresponding keys according to a function operation. For example, the headset input unit 220 may include two keys for adjusting a volume. When generation of a signal selecting a type of a call according to a call function is necessary, the headset input unit 220 may operate a volume control key as a key for generating a select signal indicating a type of a specific call.

The headset input unit 220 may generate a selection signal according to a user operation regardless of a type of a call connection request signal received from the portable terminal 100. Namely, when a user operates a key corresponding to a voice call connection select signal although the portable terminal 100 sends an image call connection request signal, the headset input unit 220 may generate and send a voice call connection select signal to the headset controller 260. When the portable terminal 100 sends an image call connection request signal to the headset 200 but receives a voice call connection request signal from the headset 200, the portable terminal may operate to perform a procedure for forming a voice call channel based on a voice call connection request signal. For example, the portable terminal 100 may transmit a rejection message corresponding to an image call connection request message to another portable terminal and then transmit a voice call connection request message to the another portable terminal through the mobile communication system 300. In a contrary case, namely, the portable terminal 100 sends a voice call connection request signal to the headset 200 but a headset 200 user may generates a select signal for an image call connection request using the headset input unit 220, and the headset 200 may send the image call select signal to the portable terminal 100. The portable terminal 100 may form an image connection to the other portable terminal even though a voice connection was requested.

In the same manner as in the first audio processing unit 130, the second audio processing unit 230 may include a headset speaker SPK2 outputting an audio signal received from the portable terminal 100 and a headset microphone MIC2 collecting an external audio signal. When the portable terminal 100 sends an audio signal among signal received based on a call channel to the headset speaker SPK2, it may output a corresponding audio signal. Further, the headset speaker SPK2 may output an alarm sound specified according to a signal indicating a type of a call provided from the portable terminal 100. Namely, the headset speaker SPK2 may output a specified signal sound or guide sound according to the voice call connection request signal or the image call connection request signal. Meanwhile, when the headset 200 includes a headset vibration module, the headset vibration module may implement a first vibration pattern and a second vibration pattern discriminating between a voice call connection request signal and an image call connection request signal.

The headset display unit 240 may be manufactured in a small size according to a space limit of the headset 200, and output information corresponding to a signal provided from the portable terminal 100 or specific information stored in a memory when the memory is provided at the headset 200. In detail, when the headset display unit 240 receives a voice call connection request signal or an image call connection request signal, it may output an image or text information indicating a type of a corresponding call, a phone number of a transmission side or phone book information allotted thereto. To do this, the portable terminal 100 may transmit the phone number of transmitting portable terminal and corresponding phone book information to the headset 200. The headset display unit 240 can be excluded according to a design policy of a manufacturing company.

The headset controller 260 operates to output a specific alarm corresponding to a signal indicating a type of a call provided from the portable terminal 100. Namely, when the headset controller 260 receives a voice call connection request signal from the portable terminal 100, it may control operations of specific constructions included in the headset 200 to implement at least one of a first alarm sound, a second vibration pattern, and a first lamp on/off sequence corresponding to the alarm sound. In this case, the headset 200 may further include a specific lamp to implement the first lamp on/off sequence. Furthermore, when the headset controller 260 receives an image call connection request signal from the portable terminal 100, it may control operations of specific constructions included in the headset 200 to implement at least one of a first alarm sound, a second vibration pattern, and a second lamp on/off sequence corresponding to the alarm sound. Moreover, the headset controller 260 converts a signal generated according to an operation of a user entered through the headset input unit 220 into a signal of a form to be transmitted to the portable terminal 100 through the second near distance communication module 270, and may operate to transmit the converted signal to the portable terminal 100. Namely, when a key input signal for a voice call connection request is generated, the headset controller 260 may operate to generate a corresponding voice call connection select signal and to transmit the corresponding voice call connection select signal to the portable terminal 100 using the second near distance communication module 270.

Next, the headset controller 260 operates to output an audio signal received by the portable terminal 100 according to the formation of a call channel through the headset speaker SPK2. At this time, when the headset controller 260 receives a signal according to the formation of the call channel from the portable terminal 100, it may operate to activate the headset microphone MIC2 to collect audio signals, and to transmit the collected audio signals to the portable terminal 100 through the second near distance communication module 270.

When a user creates an input signal for call rejection, the headset controller 260 may generate a corresponding call rejection signal and send it to the portable terminal 100 through the second near distance communication module 270. When the user creates an input signal for selecting a type of a call or an input signal for call rejection, the headset controller 260 may operate to stop outputting operations of the headset 200, i.e., alarm, vibration, and/or lamp on/off sequence. Meanwhile, when the portable terminal 100 receives a call rejection signal from the headset 200, it may operate to transmit a corresponding message to the mobile communication system 300 and to stop an alarm output.

In addition, the headset 200 may further include a memory storing unit (not shown) for storing an alarm sound specified according to a signal indicating a type of the call, i.e., a voice call connection request signal or an image call connection request signal, and for storing application programs necessary for operation of the second near distance communication module 270. The headset 200 may further include a power supply (not shown) supplying power necessary for an operation of the headset 200.

As discussed previously, the headset 200 of the present invention may output a specific alarm according to a signal capable of discriminating a type of a call provided from the portable terminal 100 generate a signal capable of selecting a type of a specific call according to a user input, and support transmitting the signal to the portable terminal 100.

The foregoing embodiment has described a construction, functions, and roles of the headset 200 and the portable terminal 100. Hereinafter, a headset operating method and a method for operating a portable terminal 100 are described with reference to FIG. 4.

Figure 4:
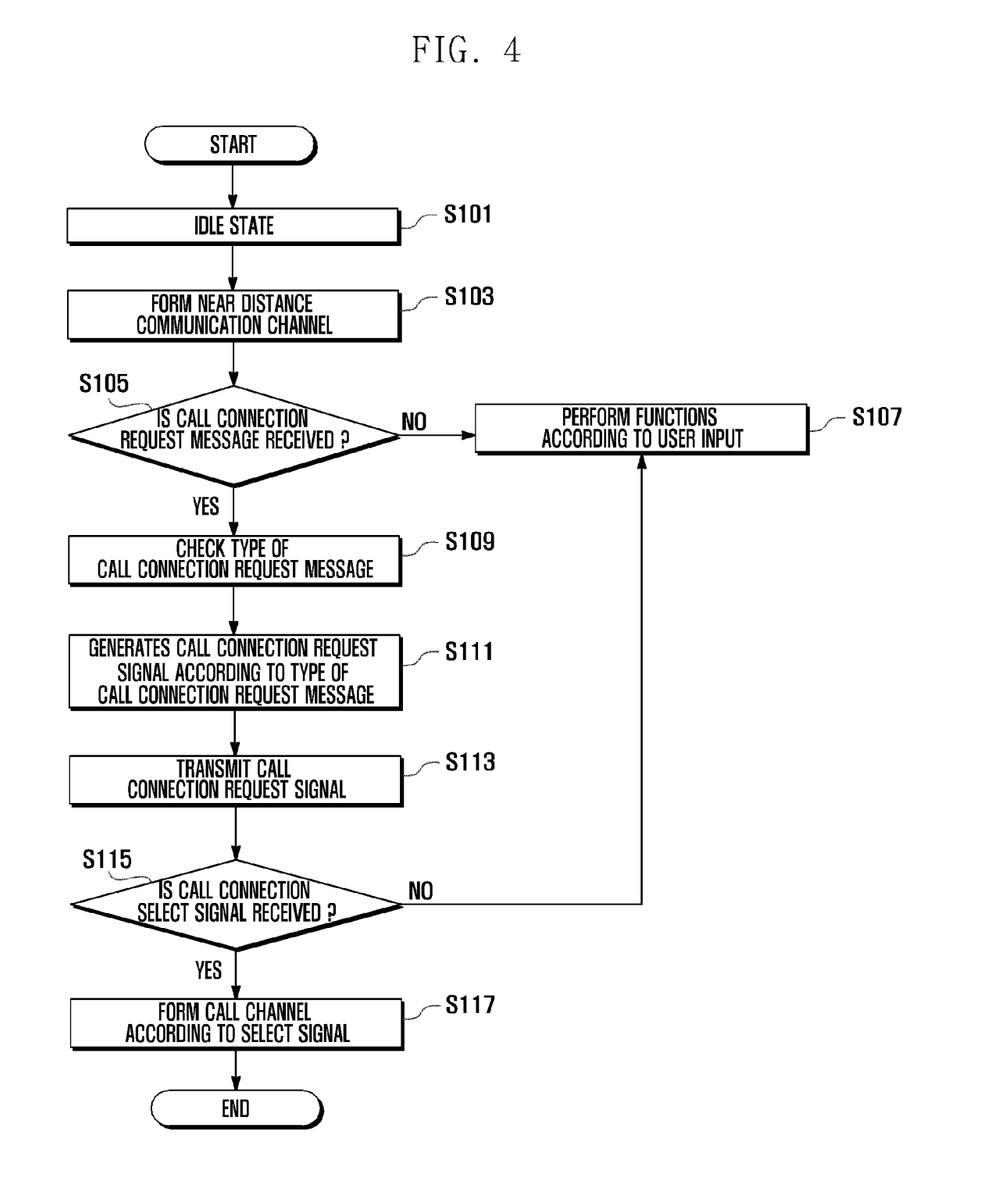
FIG. 4 is a flow chart illustrating an operation of a portable terminal according to an embodiment of the present invention.

FIG. 4 is a flow chart illustrating an operation of a portable terminal according to an embodiment of the present invention. Prior to a description, a near distance communication module is described as a Bluetooth module, however, it would be recognized that other forms of near distance communications protocols may be used without altering the scope of the invention.

Referring to FIGS. 1 to 4, a portable terminal 100 of the present invention may maintain an idle state (S101). When power from the power supply is supplied to the portable terminal, the portable terminal 100 may initialize respective constructions of the portable terminal 100 and output an idle screen according to preset schedule information.

Next, the portable terminal 100 forms a near distance communication channel with a headset 200 according to a user request (S103). In detail, when an input signal requesting formation of a near distance communication channel is generated through a menu section or a hot key input, the portable terminal 100 may supply power to a first near distance communication module 170, perform an initializing procedure, and perform a peripheral scan procedure. Further, when a headset 200 is searched through a scan procedure, the portable terminal 100 may perform a "pairing" procedure according to a user input to form a near distance communication channel using a Bluetooth module. Pairing is a well known process in the Bluetooth technology and need not be discussed in detail herein.

Then, the portable terminal 100 checks whether a call connection request message is received (S105). Namely, the portable terminal 100 may check whether or not a call connection request message is received from a mobile communication system 300. When a call connection request message is not received, the portable terminal 100 may support various user functions supported by the portable terminal 100. For example, an audio listening function according to a file playing function, a broadcast viewing function according to audio/video listening functions according to a user input, etc. (S107).

When a call connection request message is received at step 105, the portable terminal 100 may check a type of a call connection request message (S109). Because the mobile communication system 300 substantially transmits respective different messages according to the type of a call connection request message, the portable terminal 100 may check the type of a call connection request message based on a request message provided from the mobile communication system 300.

Next, the portable terminal 100 generates a call connection request signal according to the type of the call connection request message (S111). Namely, when the mobile communication system 300 transmits a voice call connection request message, the portable terminal 100 generate a corresponding voice call connection request signal. Meanwhile, when the mobile communication system 300 transmits an image call connection request message, the portable terminal 100 generates a corresponding image call connection request signal. The generated voice call connection request signal and image call connection request signal become a signal of a form capable of being transmitted to the headset 200 based on a near distance communication channel. In the meantime, the portable terminal 100 may output an alarm according to a type of a call connection request message. Namely, the portable terminal 100 may perform at least one of an alarm sound output, a vibration pattern implementation, or a lamp on/off specified according to reception of a voice call connection request message or an image call connection request message. Moreover, the portable terminal 100 may operate to output the received message on a display unit 140.

Next, the portable terminal 100 may transmit the generated call connection request signal, namely, a voice call connection request signal or an image call connection request signal to the headset 200 through a first near distance communication module 170 (S113). Then, the portable terminal 100 checks whether a call connection select signal, namely, one of a voice call connection select signal or an image call connection select signal is received from the headset 200 (S115). When a separate select signal is not received within a certain time, the portable terminal 100 may operate to perform a function according to a user input (S107). At this time, when a select signal selecting a type of a specific call is not received but a call rejection signal is received, the portable terminal 100 may generate a message for performing a received call rejection function and send it to the mobile communication system 300 or to another portable terminal through the mobile communication system 300.

Conversely, when one of the voice call connection select signal or an image call connection select signal is received from the headset 200 at step 115, the portable terminal 100 operates to form a call channel according to the received select signal (S117). Further, the portable terminal 100 may support transmission and reception of signals necessary for a voice call or an image call through a headset 200 connected by the formed call channel and a Bluetooth module.

Here, when the portable terminal 100 receives an image call connection request message from a mobile communication system, it may transmit a corresponding image call connection select signal to the headset and then receive a voice call connection select signal from the headset. Accordingly, the portable terminal 100 may automatically reject a voice call connection request of another portable terminal and automatically perform an operation for a voice call connection to a corresponding another portable terminal. Further, when the another portable terminal responds to the voice call connection request, the portable terminal 100 may operate to form a voice call channel and transmit an audio signal received through the formed call channel.

Meanwhile, when the portable terminal 100 receives a voice call connection request message, it may transmit a corresponding voice call connection select signal and then receive an image call connection select signal from the headset. Accordingly, the portable terminal 100 may automatically reject the voice call connection request and perform a procedure for forming an image call channel with another portable terminal based on the received image call connection select signal.

As illustrated earlier, the portable terminal 100 according to an embodiment of the present invention may send a signal discriminating a type of a call to a headset 200 through a formed near distance communication channel, and support the forming of a specific call channel according to a call connection select signal provided from the headset 200.

Figure 5:
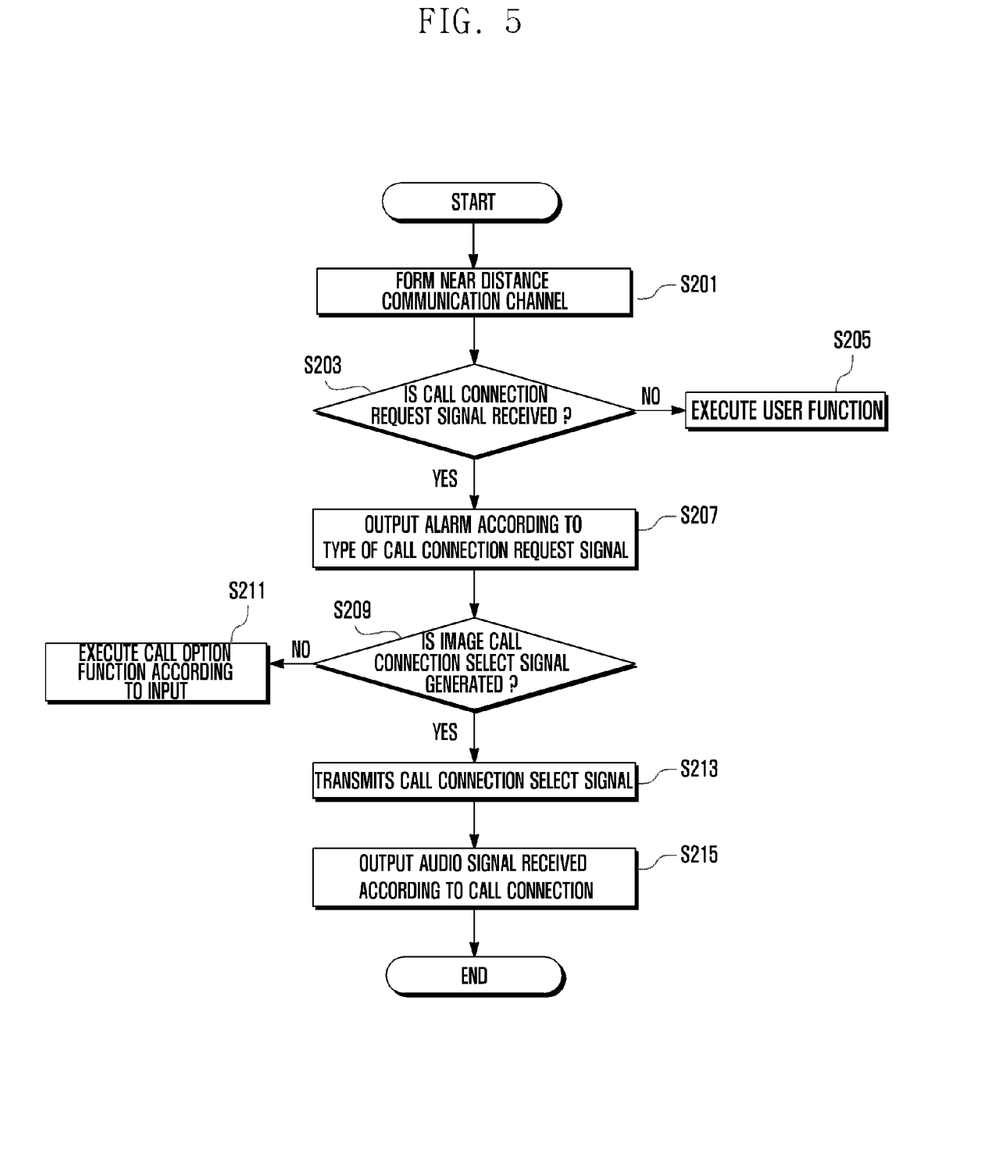
FIG. 5 is a flow chart illustrating an operation of a headset according to an embodiment of the present invention.

FIG. 5 is a flow chart illustrating an operation of a headset according to an embodiment of the present invention.

Referring to FIGS. 1 to 5, a headset 200 of the present invention forms a near distance communication channel according to a request of a portable terminal 100 (S201). To do this, the headset 200 supplies power according to a user's control, initializes respective structural elements using the supplied power, and waits for a use thereof. Next, when the headset 200 receives a signal provided according to execution of a searching procedure by the portable terminal 100 for a near distance communication device, it transmits a corresponding response signal to the portable terminal 100. The headset 200 may form a near distance communication channel according to a formation request of a near distance communication channel from the portable terminal 100. In this case, when a Bluetooth module being a near distance communication module is mounted on the headset 200 and the portable terminal 100, the headset 200 may transmit or receive signals necessary to form a near distance channel according to operation of a preset protocol to operate the Bluetooth module (i.e., pairing).

Next, the headset 200 checks whether or not a call connection request signal, namely, a voice call connection request signal or an image call connection request signal is received from the portable terminal 100 (S203). When the headset 200 does not receive a call connection request signal, the headset 200 may support the execution of a user function associated with the portable terminal 100, for example, an audio signal output function according to file playing (S205).

Conversely, when the call connection request signal is received at step 203, the headset 200 may operate to output an alarm according to a type of a call connection request signal (S207). In detail, when the headset 200 receives a voice call connection request signal, it may output a first guide sound or a first bell sound preset for the voice call connection request signal through a headset speaker SPK2 included in the second audio processing unit 230. Furthermore, when the received call connection request signal is an image call connection request signal, the headset 200 may output a second guide sound or a second bell sound preset for the image call connection request signal. Furthermore, when the headset 200 includes a headset vibration module, it may operate to execute a headset vibration module according to vibration patterns corresponding to the voice call connection request signal and the image call connection request signal, respectively. In addition, the headset 200 may output a first lamp on/off sequence and a second lamp on/off sequence corresponding to the voice call connection request signal and the image call connection request signal, respectively. Namely, the headset 200 of the present invention may output at least one of a first and a second guide sounds, a first and a second bell sounds, a first and a second vibration patterns, and a first and a second lamp on/off sequence preset according to a call connection request signal.

Next, a headset user may operate various buttons or a touch pad provided at the headset 200. In this case, the headset 200 checks whether or not a signal selecting a type of a call connection request signal according to user's operation, for example, a voice call connection select signal or an image call connection select signal is generated (S209). When the generated signal is not the call connection select signal, the headset 200 may execute a call option function according to a provided input (S211). Namely, when a user creates an input signal regarding a call rejection, the headset 200 may generate and transmit a signal for executing a call rejection function according to a corresponding function to the portable terminal 100.

Conversely, when the call connection select signal is generated at 209, the headset 200 transmits a call connection select signal to the portable terminal 100 (S213). In this case, the headset 200 converts the call connection select signal into a signal of a form capable of being transmitted through a near distance communication channel. Next, the headset 200 may receive an audio signal according to a call connection and output the received audio signal through a headset speaker SPK2 included in the second audio processing unit 230 (S215). Further, the headset 200 may activate a headset microphone MIC2 and send an audio signal collected by the headset microphone MIC 2 to the portable terminal 100.

As described above, a headset operating method according to an embodiment of the present invention may control the output of a corresponding alarm according to a call connection request signal provided from the portable terminal 100 that allows a headset 200 user to know what call connection request message is received in the portable terminal 100. In addition, the headset operating method may support the selection of a type of a specific call using buttons provided at the headset 200.

The above-described methods according to the present invention can be realized in hardware or as software or computer code that can be stored in a recording medium such as a CD ROM, an RAM, a floppy disk, a hard disk, or a magneto-optical disk or downloaded over a network (i.e., The computer program can be provided from an external source which is electronically downloaded over a network, e.g., Internet, POTS, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. The code when loaded into a general purpose computer transformed the general purpose computer into a special purpose computer that may in part be dedicated to the processing shown herein. In addition, the computer, processor or dedicated hardware may be composed of at least one of a single processor, a multi-processor, and a multi-core processor.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method, operable in a processor, for operating a peripheral electronic device, comprising:
   receiving a call connection request message requested from another portable terminal through a mobile communication system by a portable terminal;
   discriminating between a plurality of different types of call including:
   (a) a voice call and
   (b) an image call, to select a single particular call type in response to the call connection request message;
   generating a call connection request signal corresponding to the call connection message received by the portable terminal, in response to the selected single particular call type; and
   transmitting the generated call connection request signal to the peripheral electronic device, the peripheral electronic device and the portable terminal being connected through a near distance communication channel.

2. The method of claim 1, further comprising:
   forming a specific call channel for the selected single particular call type in response to the call connection request message;
   receiving the call connection request signal indicating one of a voice call and an image call from the portable terminal through the near distance communication channel by the peripheral electronic device; and
   outputting an alarm specified according to the selected single particular call type of the received call connection request signal by the peripheral electronic device wherein the call connection request message comprises signal data selecting the single particular call type.

3. The method of claim 2, wherein outputting an alarm comprises outputting at least one of a first guide sound, a first bell sound, a first vibration pattern, and a first lamp on/off sequence preset by the peripheral electronic device when the call connection request signal is the voice call connection request signal.

4. The method of claim 2, wherein outputting an alarm comprises outputting at least one of a second guide sound, a second bell sound, a second vibration pattern, and a second lamp on/off sequence preset by the peripheral electronic device when the call connection request signal is the image call connection request signal.

5. The method of claim 2, further comprising:
   generating a select signal by the peripheral electronic device as one type of a voice call or an image call; and
   transmitting the select signal to the portable terminal through the near distance communication channel by the peripheral electronic device.

6. The method of claim 5, further comprising:
   forming a voice call channel with another portable terminal through the mobile communication system by the portable terminal when the portable terminal transmits a voice call connection request signal to a peripheral electronic device and receives a voice call select signal from the peripheral electronic device;
   forming an image call channel with the another portable terminal through the mobile communication system by the portable terminal when the portable terminal transmits an image call connection request signal to the peripheral electronic device and receives an image call select signal from the peripheral electronic device;
   automatically rejecting a voice call connection request and automatically requesting the another portable terminal for an image call connection through the mobile communication system by the portable terminal when the portable terminal transmits the voice call connection request signal to the peripheral electronic device and receives the image call select signal from the peripheral electronic device; and
   automatically rejecting the image call connection request and automatically requesting the another portable terminal for the voice call connection through the mobile communication system by the portable terminal when the portable terminal transmits the image call connection request signal to the peripheral electronic device and receives the voice call select signal from the peripheral electronic device.

7. A portable terminal comprising:
   a radio frequency unit receiving one of a voice call connection request message and an image call connection request message requested by another portable terminal through a mobile communication system;
   a controller discriminating between a plurality of different types of call including:
   (a) a voice call and
   (b) an image call, to select a single particular call type in response to the call connection request signal and
   generating a call connection request signal corresponding to the received call connection request message, in response to the selected single particular call type; and
   a first near distance communication module forming a near distance communication channel for transmitting the call connection request signal to a peripheral electronic device.

8. The portable terminal of claim 7, wherein the first near distance communication module receives and sends a select signal for selecting one of a voice call connection and an image call connection from the peripheral electronic device and
  forms a specific call channel for the selected single particular call type in response to the call connection request message.

9. The portable terminal of claim 8, wherein the radio frequency unit forms one of a voice call channel and an image call channel through the mobile communication system according to a select signal received from the peripheral electronic device under the control of the controller.

10. The portable terminal of claim 9, wherein the first near distance communication module transmits an audio signal provided from the another portable terminal to the peripheral electronic device, and sends an audio signal provided from the peripheral electronic device to the radio frequency unit.

11. The portable terminal of claim 7, wherein the controller operates:
  to transmit a voice call connection request signal to the peripheral electronic device when a voice call connection request message is received from the mobile communication system, and to form a voice call channel with the another portable terminal when a voice call select signal is received from the peripheral electronic device;
  to transmit an image call connection request signal to the peripheral electronic device when an image call connection request message is received from the mobile communication system, and to form an image call channel with the another portable terminal when an image call select signal is received from the peripheral electronic device;
  to transmit a voice call connection request signal to the peripheral electronic device when a voice call connection request message is received from the mobile communication system, and automatically performing an operation for rejecting the voice call connection request and forming an image call channel with the another portable terminal when an image call select signal is received from the peripheral electronic device; and
  to transmit an image call connection request signal to the peripheral electronic device when an image call connection request message is received from the mobile communication system, and automatically rejecting an image call connection request and forming a voice call channel with the another portable terminal through the mobile communication system when a voice call select signal is received from the peripheral electronic device.

12. A peripheral electronic device comprising:
  a second near distance communication module forming a near distance communication channel with a portable terminal and receiving a call connection request signal indicating one of a voice call and an image call from the portable terminal through the near distance communication channel, the call connection request signal being derived by discriminating between a plurality of different types of call including;
    (a) a voice call and
    (b) an image call, to select a single particular call type in response to the call connection request signal;
  a peripheral electronic device controller operating to output an alarm selected from a plurality of different alarm types in response to the selected single particular call type; and
  an alarm output unit outputting the selected alarm type under control of the peripheral electronic device controller.

13. The peripheral electronic device of claim 12, wherein the alarm output unit for outputting the selected alarm type comprises at least one of:
  a peripheral electronic device speaker outputting at least one of a first guide sound, a second guide sound, a first bell sound and a second bell sound according to the call connection request signal;
  a peripheral electronic device vibration module outputting at least one of a first vibration pattern and a second vibration pattern according to the call connection request signal; and
  a lamp executing at least one of a first lamp on/off sequence and a second lamp on/off sequence according to the call connection request signal.

14. The peripheral electronic device of claim 12, further comprising a peripheral electronic device input unit selecting one of the voice call and the image call.

15. The peripheral electronic device of claim 14, wherein the peripheral electronic device controller operates to generate a select signal for selecting one of the voice call and the image call, and to transmit the select signal to the portable terminal through the second near distance communication module.

16. A system for operating a peripheral electronic device, comprising:
  a portable terminal receiving a call connection request message, through a mobile communication system, the call connection request message comprising one of a voice call connection request message or an image call connection request message requested by another portable terminal, discriminating between a plurality of different types of call including,
    (a) a voice call and
    (b) an image call, to select a single particular call type in response to the received call connection request signal;
  generating a call connection request signal in response to the selected single particular call type, and transmitting the generated call connection request signal to a peripheral electronic device through a near distance communication channel; and
  a peripheral electronic device,
    receiving the call connection request signal through the near distance channel and outputting an alarm selected from a plurality of different alarm types in response to the selected single particular call type.

17. A system of claim 16, wherein the portable terminal comprises:
  a radio frequency unit receiving one of a voice call connection request message or an image call connection request message requested by another portable terminal through the mobile communication system;
  a controller generating a call connection request signal corresponding to the received call connection request message and transmitting the generated call connection request signal to the peripheral electronic device; and
  a first near distance communication module forming a near distance communication channel for transmitting the call connection request signal between the portable terminal and the peripheral electronic device, and
  wherein the controller operates:
    to transmit a voice call connection request signal to the peripheral electronic device when a voice call connection request message is received through the mobile communication system, and to form a voice call channel with the another portable terminal when a voice call select signal is received from the peripheral electronic device;

to transmit an image call connection request signal to the peripheral electronic device when an image call connection request message is received through the mobile communication system, and to form an image call channel with the another portable terminal when an image call select signal is received from the peripheral electronic device;

to transmit a voice call connection request signal to the peripheral electronic device when a voice call connection request message is received from the mobile communication system, and automatically performing an operation for rejecting the voice call connection request and forming an image call channel with the another portable terminal when an image call select signal is received from the peripheral electronic device; and to transmit an image call connection request signal to the peripheral electronic device when an image call connection request message is received through the mobile communication system, and automatically rejecting an image call connection request and forming a voice call channel with the another portable terminal through the mobile communication system when a voice call select signal is received from the peripheral electronic device.

18. The system of claim 16, wherein the peripheral electronic device comprises:

a second near distance communication module forming a near distance communication channel with the portable terminal and receiving a call connection request signal indicating one of a voice call and an image call from the portable terminal through the near distance communication channel;

a peripheral electronic device controller operating to output an alarm specified according to a type of the call connection request signal; and an alarm output unit outputting the specified alarm under control of the peripheral electronic device controller, and the alarm output unit comprises at least one of:

a peripheral electronic device speaker outputting at least one of a first guide sound, a second guide sound, a first bell sound and a second bell sound according to the call connection request signal;

a peripheral electronic device vibration module outputting at least one of a first vibration pattern and a second vibration pattern according to the call connection request signal; and a lamp executing at least one of a first lamp on/off sequence and a second lamp on/off sequence according to the call connection request signal.

19. The system of claim 18, further comprising a peripheral electronic device input unit selecting one of the voice call and the image call.

20. The peripheral electronic device of claim 18, wherein the peripheral electronic device controller operates to generate a select signal as one of the voice call and the image call, and to transmit the select signal to the portable terminal through the second near distance communication module.

* * * * *